Figure 1:
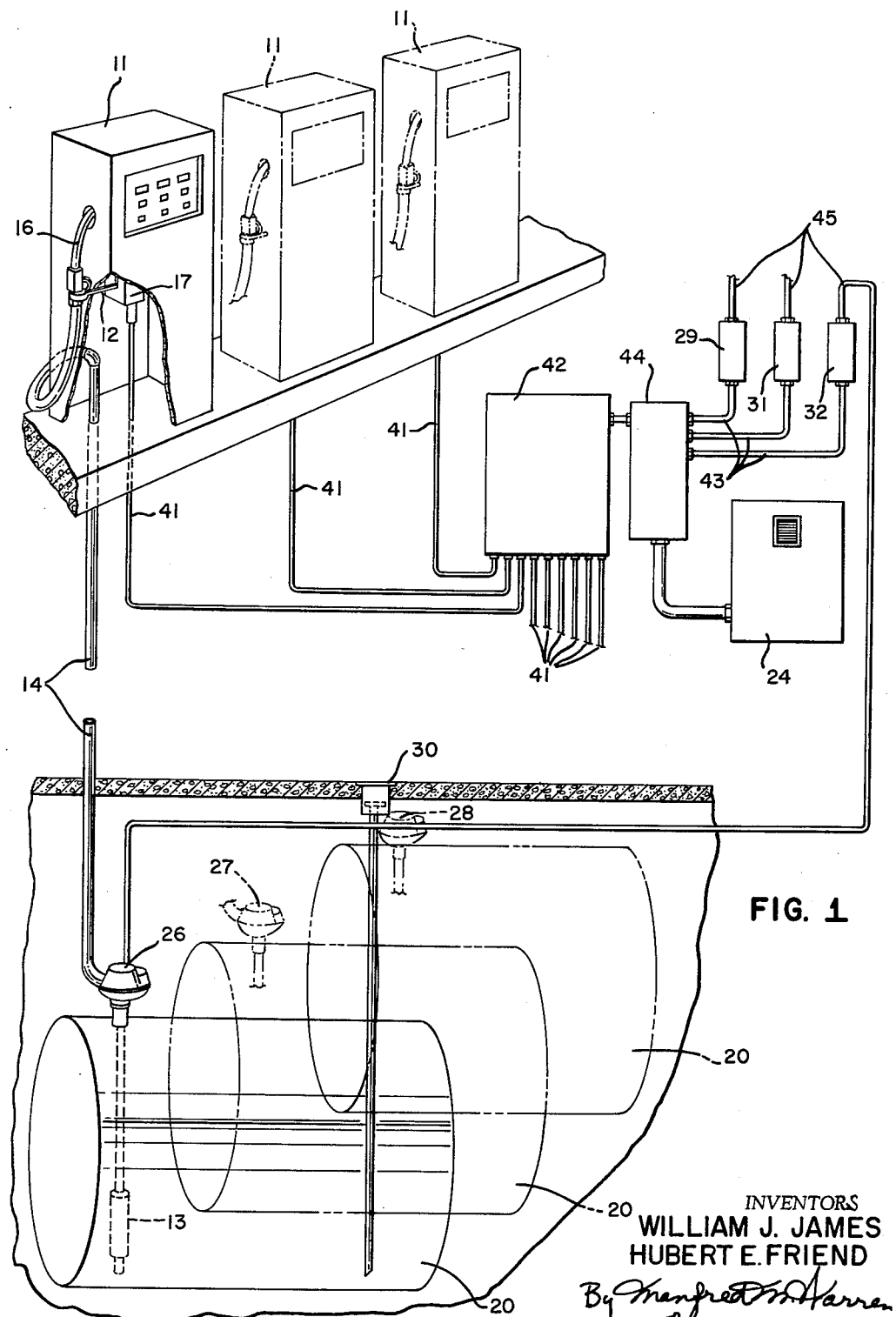

INVENTORS
WILLIAM J. JAMES
HUBERT E. FRIEND
ATTORNEY

INVENTOR.
WILLIAM J. JAMES
HUBERT E. FRIEND

United States Patent Office 3,203,593
Patented Aug. 31, 1965

3,203,593
GASOLINE SERVICE STATION USE
INDICATING APPARATUS
William J. James, Box 351, Berkeley, Calif., and Hubert E. Friend, Berkeley, Calif.; said Friend assignor to said James
Filed Aug. 29, 1963, Ser. No. 305,408
4 Claims. (Cl. 222—30)

This invention relates generally to the operation of gasoline service stations, and more particularly to apparatus for recording the extent of business activity in a service station.

The successful operation of a gasoline service station depends to a large extent on being able to give quick and efficient service to its customers. In this regard, it is very useful to determine the nature and extent of the business activity in a service station throughout each day's operation. This type of information enables the station owner to staff the station with a sufficient number of attendants to accommodate the various peaks and lulls in the day's activity. Moreover, such information enables the owner to determine what hours or days it is and is not profitable to keep the station open for business.

It will be appreciated that most modern service stations are equipped with several service "islands" with each island having a plurality of gasoline dispensers. Usually, dispensers are provided to accommodate two or three different grades of gasoline, each having different octane ratings. The common practice is to have one underground storage tank to hold each grade of gasoline, with a pump being provided for each tank to supply the particular gasoline to the several corresponding dispensers. For a given service station there may be as many as four or more dispensers connected to each pump and tank associated with one grade of gasoline.

Heretofore it has been sought to determine business activity by measuring the number of gallons being pumped out of each tank during given intervals of time during the day's operation. This procedure, however, has not been found to provide sufficient information on which to base determinations of the type noted hereinabove. More particularly, the number of gallons being taken out of each tank does not indicate the number of customers being serviced during a given interval of time. The actual activity and service required of the attendants may vary substantially for a given amount of gasoline sales. While one customer may buy five gallons as compared to another purchase of 20 gallons, both of these customers will require about the same amount of service and time of the attendant.

Consequently, it has been found that more useful information will be obtained by measuring the number of individual uses of each gasoline dispenser in the station, in relation to given time intervals. In this manner, it becomes possible to estimate more closely the actual number of automobiles serviced by the attendants at various times of the day, and thus determine more accurately the demands and needs of a service station.

It will be appreciated that the activity of the gasoline pumps, of which there is only one for each grade of gasoline, cannot be employed to measure the activity of each dispenser. The common arrangement is to provide each dispenser with a manually operated lever or other means which serves to turn the pump on or off. This is desirable since there is no need to maintain operation of the pump when no dispenser is in use. When one dispenser of a particular grade gasoline is being used, simultaneous use of other dispensers for the same grade gasoline has no effect on the pump. That is, when the lever on the first dispenser to be used is turned on, this turns the pump on and places the dispenser in dispensing condition. If, however, while the first dispenser is in use a second dispenser of the same grade is used, the second dispenser simply avails itself of the pump which is already operating. Should the first dispenser cease operation, the pump will continue to operate so long as the second dispenser, or any others, remain in dispensing condition. When the lever on the only dispenser in use is turned off, only then does the pump cease its otherwise uninterrupted operation. Consequently, the continuous operation of a pump gives no indication as to the individual activity of each dispenser to which the pump is connected.

In attempting to measure the activity of the various dispensers in a service station, several factors must be considered. It is general practice for the electrical system controlling the operation of gasoline pumps and dispensers to be approved by an independent testing or approval agency, in order that the service station comply with various laws. Once a system is approved, it cannot be substantially altered without necessitating further inspection and approval procedure. Thus, to avoid such complications, it is desirable that the use indicating apparatus be connected to the existing system without altering its operation. Another practical requirement is that the combined station activity be recorded at a central location, rather than having individual records compiled for each dispenser. In the latter situation, it would be necessary to make a separate total compilation of the individual records for each measured time interval of the day, which would be burdensome where 12 or more dispensers are used in a single station.

Accordingly, it is a main object of the present invention to provide apparatus for measuring the number of uses of all the gasoline dispensers in a service station, in relation to a given time interval, and which operates independently of the fact that several dispensers may be supplied at the same time by a single continuously operating pump.

Another object of the present invention is to provide apparatus of the character described which can be connected to existing service station systems without substantially altering the operation of such systems.

A further object of the present invention is to provide use indicating apparatus for gasoline service stations which enables a single centrally located unit to be coupled into an existing gasoline dispensing system for sensing and recording the uses of a plurality of dispensers positioned at various locations throughout the station.

The invention possesses other objects and features of advantage, some of which of the foregoing will be set forth in the following description of the preferred form of the invention which is illustrated in the drawing accompanying and forming part of this specification. It is to be understood however, that variations in the showing made by the said drawing and description may be adopted within the scope of the invention as set forth in the claims.

Figure 2:
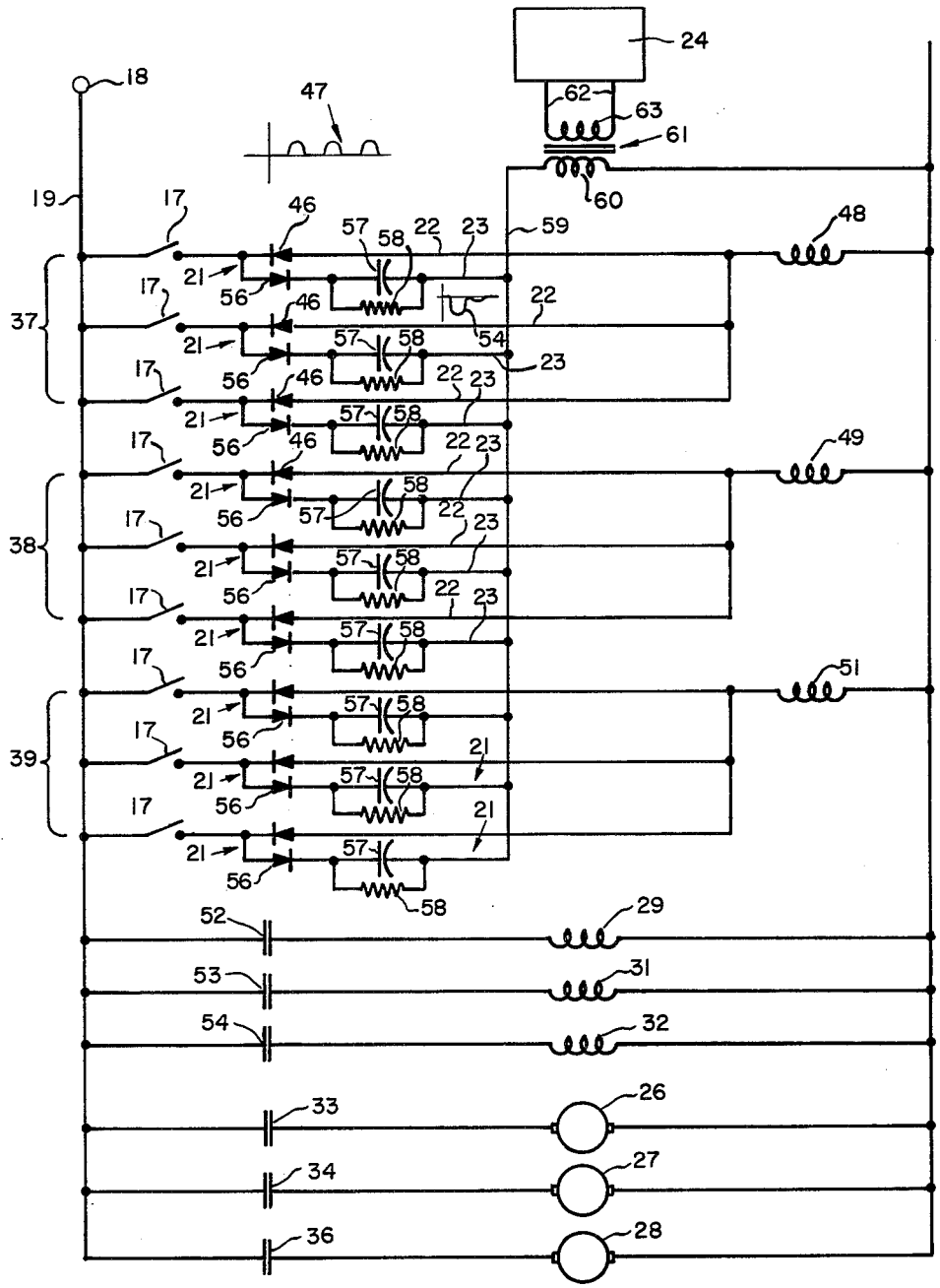

Referring to said drawings (two sheets):

FIGURE 1 is a diagrammatical illustration of a gasoline pump and dispensing system adapted with use indicating apparatus in accord with the present invention; and FIGURE 2 is an electrical schematic diagram of the system shown in FIGURE 1.

In broad terms, a gasoline station adapted with the use indicating apparatus of the present invention includes a plurality of gasoline dispensers, such as the dispenser 11 shown in FIGURE 1, for delivering gasoline to a plurality of automobiles. Manually operated means, such as the lever 12, are connected to each dispenser for selectively placing it in dispensing or nonoperative condition. When in dispensing condition, gasoline supply means including a pump 13 provide gasoline under pressure through a conduit 14 to the dispenser nozzle 16, which can be used to transfer gasoline into an automobile's gas tank. A plurality of electrical switches 17 are mounted one on each dispenser and adapted for actuation upon operation of the means or lever 12. Electrical power means are connected to the switches 17, which may be accomplished by connecting a suitable electrical power supply to the terminal 18 shown in FIGURE 2 and which feeds to the switches 17 through a line 19. A plurality of pairs 21 of branch electrical circuits 22 and 23 are connected to have each pair 21 responsive to power from the line 19 upon actuation of one of the switches 17. Upon actuation of a given switch 17, the corresponding branch circuit 22 is adapted to couple power into the gasoline supply means by energizing the pump 13, and maintaining operation of the pump so long as the corresponding dispenser is in dispensing condition. The other branch circuit 23 generates a pulse upon actuation of the switch, and pulse responsive user indicating means, such as a recorder 25, is provided to indicate, and here record, the event of each pulse generated by the pulse forming circuits 23.

As will be appreciated, large, modern service stations are constructed with a plurality of usually submerged tanks 20 each fitted with a pump 13 for dispensing different grades, usually two or three, of gasoline. Such stations usually have a plurality of dispenser locations, sometimes referred to as islands, for accommodating vehicles which may be driven to position for servicing on opposite sides of each island. Each of the islands is usually equipped with at least one dispenser, and frequently more for dispensing each grade of gasoline. Thus, a service station may have three or more islands, each equipped with three or more dispensers, for dispensing from each of the islands two or three different grades of gasoline. The electrical diagram, FIGURE 2, shows a service station arrangement having three separate sources or grades of gasoline which may be dispensed from three different islands, and wherein each of the islands is provided with three dispensers connected one to each of the three sources. Thus, the service station has three supply tanks 20, each equipped with a pump 13 which is in turn driven by an electric motor 26 in the case of one tank, 27 in the case of a second tank, and 28 in the case of the third tank. These three electric motors are identified in FIGURE 2 by the numerals 26, 27 and 28 and by the legend M1, M2, and M3; and they are individually controlled by means of relay controller coils 29, 31 and 32, which respectively have contacts 33, 34 and 36. These contacts are seen respectively to control the operation of the motors 26, 27 and 28, whereby energization of one of the controller coils closes its respective contacts thus directing power from the line 19 into the respective motor. The switches 17 are categorized into three groups 37, 38 and 39, with each group corresponding to the switches mounted on a dispenser of one of the three grades of gasoline. Prior to connection of the instant apparatus, each of the switches in one of the groups couples directly to one of the three controller coils, whereby any switch in one group would operate its corresponding controller coil. Two or more switches in the same group operating at the same time would divide the current in parallel to the controller coil, with the controller coil remaining actuated so long as any one switch in the corresponding group was in closed position. As shown in FIGURE 1, electrical conduits 41, each connected to the switch 17 mounted on one of the dispensers, all lead into a main panel 42, which is disposed at some central location in the service station conveniently accessible remote from the dispenser 11. Electrical conduits 43 then usually lead from appropriate connections in the panel 42 to the controller coils 29, 31 and 32.

The present invention involves the provision of a sensing unit 44 which is connected into the existing system intermediate the panel 42 and the controllers 29, 31 and 32. The sensing unit includes the aforementioned plurality of pairs 21 of branch circuits, which pairs are each hooked into the panel 42 in connection with one of the conduits 41 leading from a switch 17. The branch circuit 22 consists of means for transmitting current only in one direction, preferably a rectifier such as the diode 46. Consequently, half-wave rectified current, as indicated at 47, will flow through the branch 22 when its corresponding switch 17 is closed and with alternating current being supplied at power terminal 18. It in some instances will suffice to pass the current from branch 22 directly through one of the controller coils 29, 31 or 32, since the half-wave power may be enough to operate such coil. For positive operation, however, it usually is desirable that a second set of controller coils 48, 49 and 51 be coupled to the branch circuits 22 corresponding respectively with the switches 17 of the groups 37, 38 and 39, as shown in FIGURE 2. The controllers 48, 49 and 51, which form a part of the unit 44, operate respectively their contacts 52, 53 and 54, which in turn couple power from the line 19 respectively to the coils 29, 31, and 32. In this manner, the controller coils 48, 49 and 51 can be made sufficiently sensitive to assure stable operation by the half-wave current from the branches 22.

The branches 23 each consist of means for receiving current only in one direction opposite of that in the branch 22. Furthermore, means are provided to limit such current to an extremely short period of time, whereby the current through the branch 23 consists mainly of a short half cycle pulse 54, followed by rapidly decaying pulses. Preferably, the branch circuits 23 each consist of a rectifier, such as the diode 56, connected in series with a capacitor 57, and a resistor 58 connected in parallel with the capacitor. The initial currrent pulse through a branch circuit 23 appears momentarily on the line 59, which leads through one winding 60 of a transformer 61. The output lines 62 from the other transformer winding 63 conduct the pulse to the pulse responsive recording means 24, which may be of conventional construction and which is adapted to record the number of pulses received for given time intervals.

In the operation of the instant apparatus, each use of a dispenser 11 requires closing the switch 17 mounted on the dispenser. When the switch closes, alternating current is fed into the corresponding circuit pair 21, with this current being phase split through the two branch circuits 22 and 23. Half the current phase serves to operate the pump corresponding to the particular dispenser in substantially the same manner as it operates in a system not adapted with the instant apparatus. The other half of the current phase serves to generate a pulse in the branch circuit 23, which pulse is recorded by the means 24 as a use of the dispenser. Should another dispenser for the same grade of gasoline be operated while the first is still operating, the switch 17 of the second dispenser operates in its usual manner, thus supplying current to its corresponding circuit pair 21. Half the phase of this current passes through the controller coil, having no effect on operation of the pump. The other half phase of the current, however, causes a pulse to be generated in the corresponding branch circuit 23. Thus, the recording means 24 will indicate the use of the second dispenser, even though it is operating at the same time as another dispenser connected to the same pump. The only possibility of two simultaneous uses of two dispensers not being discriminated by the recorder would be if the two switches 17 were closed at substantially exactly the same instant of time. Since the pulse formed with conventional 60 cycle A.C. current occurs within $\frac{1}{120}$ of a second the short duration of the effective pulse or pulse train precludes the likelihood of simultaneity.

When a dispenser is placed into nonoperative condition, thus opening up the corresponding switch 17, the capacitor in the branch circuit 23 is discharged relatively slowly through resistor 58 thus placing the capacitor in condition to set up the desired pulse 54 on the next closing of its associated switch 17. In the foregoing circuitry, it will be noted that transformer 61 serves as a mixer for all of the connected pulsing circuits, that is, the primary winding 60 of the transformer "sees" pulses from all of the connected branch circuits 23. At the same time, the secondary winding 63 yields a net pulse of desired voltage and thus leads 62 connected to the read-out device 24 are isolated and free from the 115 volt A.C. supply line. For example, the system may be easily designed to provide a net pulse at the output of transformer 61 of approximately 6 volts, which low voltage is desirable from various standpoints in and about the gasoline service station. Additionally, it will be observed that the fact that the pulse circuits 23 are isolated from the load circuits 22 makes possible the use of a single read-out device with a plurality of dispensers connected to the same load circuit, and also makes possible the use of a single read-out device connected to a plurality of such load circuits. Various commercially-available pulse responsive totalizing counters may be used for the readout device.

It will be appreciated from the foregoing that the apparatus of the present invention is readily connected into existing gasoline dispensing systems without altering their normal mode of operation. Moreover, the present invention enables ready compilation of the number of uses of a plurality of dispensers in a service station for given time intervals, notwithstanding simultaneous operation of two or more dispensers in connection with a single pump.

We claim:

1. A gasoline service station use indicating apparatus comprising, a plurality of dispensers for delivering gasoline to a plurality of automobiles, a supply pump for supplying gasoline to said dispensers and including an electrically operated motor, manually operated means connected to each dispenser for selectively placing each dispenser in dispensing or nonoperative condition, a plurality of electric switches each having open and closed positions and each being mounted on one of said dispensers, said switches each being adapted to be in open position when its corresponding dispenser is in nonoperative condition and in closed position when the dispenser is in dispensing condition, alternating current power supply means electrically connected to said switches, a first plurality of branch circuits each connected to one of said switches and adapted to receive current in one direction from said power supply means when said corresponding switch is in closed position, electrical switching means coupled to said branch circuits and responsive to current from any one of said circuits when any one of said switches is in closed position, said switching means being adapted to energize said motor in response to current in any one of said branch circuits, a second plurality of branch circuits each connected to one of said switches and adapted to receive current in the opposite direction from that of said first branch circuits, said second branch circuits each including means for limiting said current therein to a predetermined pulse, and pulse responsive recording means coupled to said second plurality of branch circuits for recording the events of pulsed currents therein.

2. An apparatus as defined in claim 1 wherein said first branch circuits each comprise a first rectifier adapted to pass current only in one direction; and wherein said second branch circuits each comprise a second rectifier adapted to pass current in the opposite direction from that of said first rectifiers, a capacitor coupled in series with said second rectifier, and a resistance coupled in parallel with said capacitor.

3. In a service station; first and second plurality of dispensers arranged for the simultaneous delivery of different grades of liquid fuel to a plurality of vehicles; first and second power operated fuel supply means connected respectively to said first and second plurality of dispensers; a pulse responsive user indicating device; a plurality of electric switches, one associated with each of said dispensers; and electric circuitry adapted for connection to a source of alternating current electric power and providing a plurality of pairs of branch circuits connected one pair to each of said switches, current phase splitting means connected to provide opposite phase current flow in the circuits of each of said pairs, one of said circuits of each pair incorporating a pulse generating component activated upon activation of its associated switch, a transformer having a primary winding connected to all of said last named circuits and a secondary winding connected to said device, the other circuit of each pair being connected to the associated fuel supply means.

4. In a use indicating apparatus; a plurality of dispensers arranged for the simultaneous fluid delivery; power operated fluid supply means connected to said dispensers; a pulse responsive user indicating device; a plurality of electric switches, one associated with each of said dispensers; and electric circuitry adapted for connection to a source of alternating current electric power and providing a plurality of pairs of branch circuits connected one pair to each of said switches, current phase splitting means connected to provide opposite phase current flow in the circuits of each of said pairs, one of said circuits of each pair being connected to said device and incorporating a pulse generating component activated upon activation of its associated switch, the other circuit of each pair being connected to said means for energizing said means upon actuation of any of said switches.

References Cited by the Examiner

UNITED STATES PATENTS

| | | |
|---|---|---|
| 1,592,276 | 7/26 | Knopp. |
| 2,565,084 | 8/51 | Parks _____ 222—36 X |
| 2,869,788 | 1/59 | Turner. |

LOUIS J. DEMBO, *Primary Examiner.*